Figure 1:
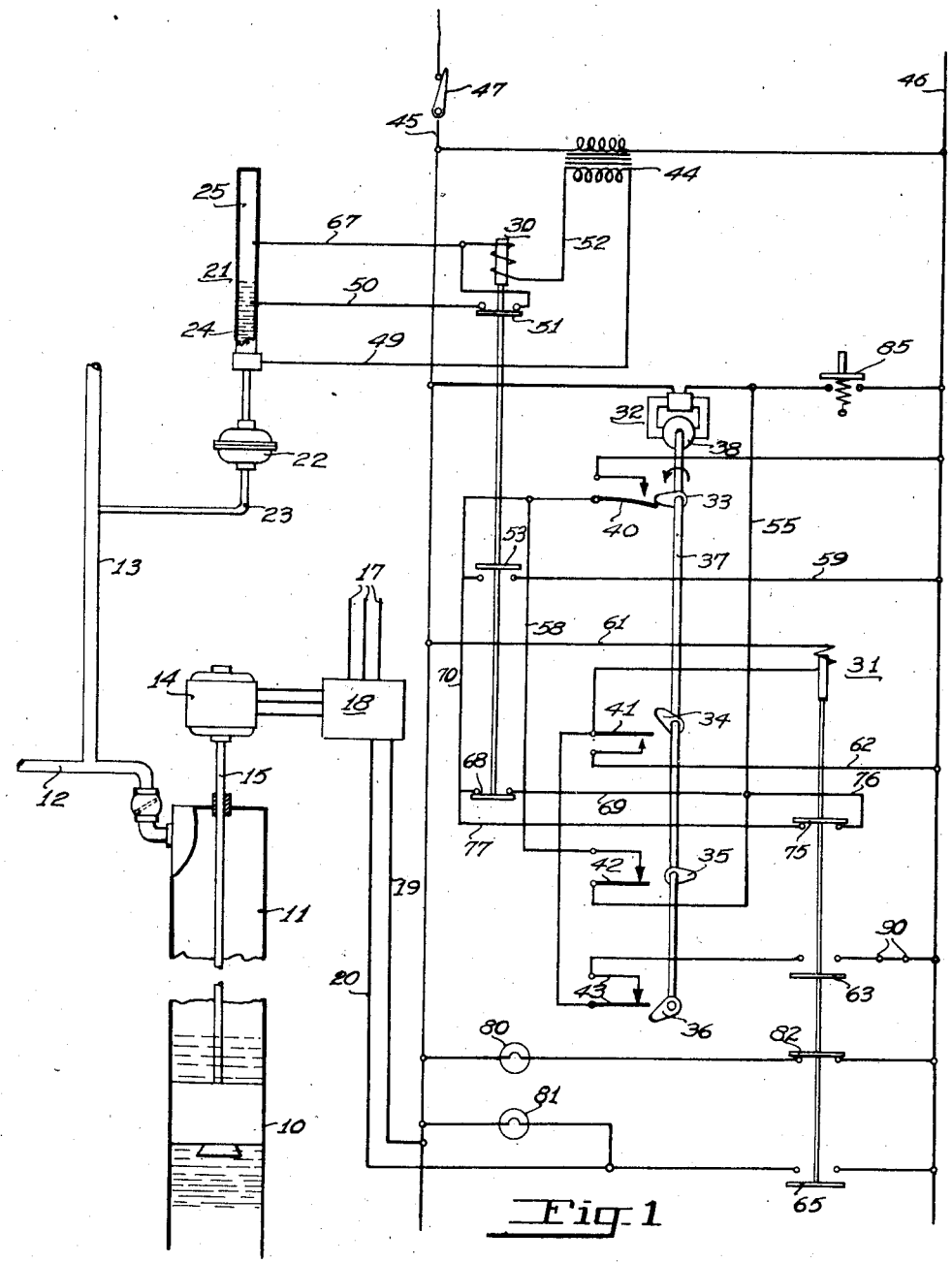

Nov. 4, 1947.  R. F. TEESON  2,430,257
MOTOR CONTROL APPARATUS
Filed June 15, 1943

ROBERT F. TEESON
INVENTOR

BY
ATTORNEY

Patented Nov. 4, 1947

2,430,257

UNITED STATES PATENT OFFICE 2,430,257

MOTOR CONTROL APPARATUS

Robert F. Teeson, Cathlamet, Wash., assignor of one-half to John S. Shute, Portland, Oreg.

Application June 15, 1943, Serial No. 490,862

8 Claims. (Cl. 103—25)

This invention relates to automatic control systems and, more particularly, to arrangements for controlling an electric motor.

Frequently electric motors arranged for driving capacity loads must be started in the unloaded condition for, if it is attempted to start such motors while loaded, damage may occur either to the motor due to overheating or to the drive connection. In certain applications the load will automatically drop off within a predetermined period of time following deenergization and stopping of the motor and, in which case, the motor cannot safely be reenergized until after such period of time. It is desirable, therefore, to provide a control system for such a motor which, when deenergized for any reason, cannot be restarted until after a lapse of a certain period of time within which it is given a full opportunity to become unloaded or otherwise conditioned for starting.

Consider, for example, the specific case of a deep well turbine pump driven through a long coupling shaft by a motor mounted on top of the well. Immediately upon deenergization of the motor the water column within the well will start to fall back through the pump causing it and the motor to be driven thereby in the reverse direction. After a certain length of time the water level will settle and the pump and motor will come to rest. If power should suddenly be reapplied to the motor during the period that it is being spun in the reverse direction, the windings may become seriously overheated before the fall of the water column is checked or the torsional strain upon the drive shaft following the sudden application of power to the motor may result in breakage of the shaft or of the couplings at the opposite ends thereof. In instances where the power supply system is provided with automatic reclosing breakers for rapidly restoring service following a temporary power outage, injuries are common to motor installations of the type mentioned.

It is an object of the present invention, therefore, to provide a new and improved automatic control arrangement for a motor whereby, following a deenergization thereof for any reason, it cannot be reenergized until after a predetermined period of time.

A further object of the invention is to provide a new and improved automatic control arrangement for a motor fast coupled to a load which is automatically removed within a predetermined period of time following deenergization of the motor, the control arrangement including means whereby the motor is locked out following deenergization thereof until it becomes unloaded.

A still further object of the invention is to provide a new and improved automatic control arrangement for a deep well turbine pump whereby the motor is locked out following a temporary power outage until after the water column in the well descends to a stationary level.

It is also an object of the present invention to provide a new and improved automatic control system for a driving motor whereby the motor is automatically started and stopped in response to predetermined conditions, and upon a deenergization of the motor due to temporary power failure, the motor is automatically restarted after a predetermined period of time.

In accordance with one form of the present invention, a motor control system is provided which includes a condition responsive device for effecting the normal starting and stopping of a deep well turbine pump motor. The system also includes, among other things, a cam switch arrangement driven by a timing motor which is so connected and integrated with the system that after a deenergization of the motor for any reason, such as a temporary power outage, the motor is locked out for at least a predetermined period of time. Irrespective of the speed with which the power is restored the motor is maintained deenergized until after the water column above the pump has an opportunity to descend to a static level and after which the motor is automatically restarted. A predetermined period of time following restarting of the motor, the control thereof is transferred to the condition responsive device again.

For a consideration of what is believed novel and inventive, attention is directed to the following description taken in connection with the accompanying drawings, while the features of novelty will be pointed out with greater particularity in the appended claims.

Figure 2:
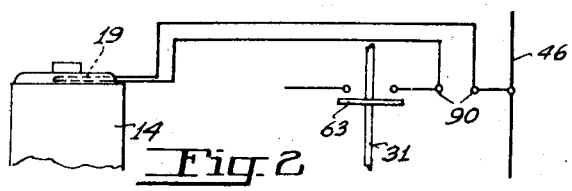

In the drawings Fig. 1 is a schematic diagram illustrating the invention in one form thereof and Fig. 2 is a partial schematic diagram illustrating a further embodiment.

In the following description the invention will be described with particular regard to one specific application, namely, for controlling the driving motor connected to a deep well turbine pump but it will become obvious, as the description proceeds, that the control arrangement is not necessarily so limited in that it may be equally well adapted for the control of other motors.

Referring to the drawings, in Fig. 1 is shown schematically a deep well turbine pump 10 arranged within the well casing 11 for raising water up to the header 12 and into a standpipe indicated by the vertically extending pipe section 13. An electric motor 14 mounted on top of the well 11 and connected to the pump 10 by a drive shaft 15 is adapted to receive electric energy from a source of supply through conductors 17 and a suitable relay actuated switch gear 18. The operation of the switch gear is adapted to be controlled through a low voltage control circuit 19—20 which, in turn, is controlled by the automatic control arrangement of the present invention.

The motor 14 is adapted to be started and stopped in accordance with start and stop indications provided by a condition responsive device such as a switch means responsive to variations in water level occurring within the standpipe 13 so as to maintain at least a predetermined pressure head upon the distribution system connected thereto. Any suitable condition responsive device may be used for indicating the variations in water level, such as a float switch or a pressure responsive switch 21. The pressure responsive switch shown includes a diaphragm device 22 which is connected to the stand pipe 13 by a tube 23 and a movable contact illustrated in this instance as consisting of a mercury column 24 arranged within a glass tube 25 communicating with the device 22.

The control arrangement comprises a first relay 30, a second relay 31 and a motor driven cam switch indicated generally at 32. The cam switch 32 includes a plurality of cams 33, 34, 35 and 36 which are rotatable by the shaft 37 of the motor 38, the cams being radially displaced from each other upon the shaft 37 as will be more fully described hereinafter. The cams 33 to 36 are adapted to operate at spaced intervals of time the corresponding switches 40 to 43, respectively, arranged adjacent thereto. The motor 38 may be of a geared telechron type whereby the shaft 37 is driven relatively slowly in the direction of rotation indicated at a speed, for example, of one revolution per eight minutes.

The apparatus, connected in a manner to be described, is adapted to be energized through the supply conductors 45, 46, it being understood that these conductors are supplied from the same source as are the conductors 17, even though at a possibly lower voltage. A manual control switch 47 may be provided in one of the conductors, such as 45.

Assume first that the head of water in the standpipe 13 is at a normal level and that the pump driving motor 14 is at rest. Under this condition of pressure head the mercury column 24 will stand at some intermediate position as indicated and the relay 30 will be energized and held in a lifted position as shown. In the specific embodiment shown, the relay 30 is adapted to be energized from the supply circuit 45, 46 through a step-down transformer 44, the secondary voltage of which may, for example, be 12 volts. The relay 30 is controlled by the water level responsive device 21 to which it is connected and under the conditions first assumed it is energized through the circuit extending from one side of the secondary of transformer 44, through the conductor 49 connected to the metal fitting at the lower end of the mercury column 24, through the mercury column, conductor 50, the raised holding contact 51 of relay 30, through the relay winding, and conductor 52 to the other side of the transformer secondary. In the raised position of the relay 30 the motor 38 of the time switch 32 is deenergized and the various switches will be in the relative positions as shown where they came to rest at the end of the preceding cycle of operation. In this condition of rest, it will be observed, that the cam 33 is in engagement with the corresponding switch 40 holding it in an open circuit position while the remaining cams are out of engagement with their respective switch elements. The relay 31 is also deenergized and in the position shown.

Now assume that the pressure head in the standpipe 13 has fallen a predetermined amount making it desirable to start up the pump to replenish the water supply in the standpipe. Upon such a drop in the pressure head the mercury column 24 will fall opening the circuit between the conductors 49 and 50 thereby deenergizing the relay 30 permitting it to drop out. Upon dropout of the relay 30 the holding contact 51 moves to the open circuit position while contact 53 thereof moves to a closed circuit position establishing an energizing circuit for the timer motor 38. This circuit may be traced from the supply line 45 through conductor 54, motor 38, conductor 55, the closed cam switch 42, conductor 58, closed contacts 53 and conductor 59 to the other supply line 46. Upon energization and rotation of the timer motor 38, the cam 33 will disengage the movable contact of the switch 40 permitting it to move to the normally closed condition thereby establishing a by-pass circuit between the conductor 58 and the supply line 45 around the contact 53 of the relay 30.

A predetermined period of time after the initial energization of the timer motor 38, such as, for example, two minutes, the cam 34 will actuate the contacts of the normally open switch 41 to the closed circuit position thereby effecting the energization of the relay 31. This circuit may be traced from the supply line 45 through conductor 61, the winding of relay 31, the closed contacts of switch 41 and conductor 62 to the other supply line 46. Upon the pickup of the relay 31 and closure of its normally open contact 63, a holding circuit is established for the relay through the normally closed contacts of the cam switch 43, which bypasses the cam switch 41, to the supply line 46. It will be understood that the contacts of switch 41 are closed only momentarily in that they are reopened upon continued movement of the cam 34 therepast.

Upon energization of the relay 31 and closure of its contact 65, the control circuit 19—20 for the switch gear 18 is energized so as to effect connection of the motor 14 to the power supply 17.

The timer motor 38 will continue in operation until the cam 35 actuates the normally closed contacts of switch 42 to the open circuit position whereupon the motor 38 will be deenergized, contacts 42 being held open by the cam 35 in engagement therewith. This is the normal condition of rest for the time switch 32 during pumping operation.

The time delay period between the closing of cam switch 34 and the opening of the cam switch 35, which may be, for example, three minutes, provides ample time for pump surges in the standpipe 13 to smooth out before the control of the system is transferred to the pressure responsive device 21. As will subsequently appear false fluctuations of the mercury column due to pumping surges might otherwise cause premature pickup of relay 30 which in turn would result in momentary energization of the timer motor 38 and deenergization of the pump motor 14.

Now assume that the motor 14 and the turbine pump 10 connected therewith have been in operation for such a time as to build up the pressure head within the standpipe 13 to such an extent that the mercury column 24 is raised within the tube 25 to close the circuit between conductors 49 and 67 thereby establishing an energizing circuit for the relay 30. This latter circuit extends through conductor 49, mercury column 24, conductor 67, winding of relay 30, conductor 52 to the other terminal of the transformer 44. Immediately upon the pickup of relay 30 the contact 51 thereof is closed thereby establishing the previously described holding circuit for relay 30. Upon closure of the contact 68 of relay 30 an energizing circuit is established for the timer motor 38 extending from the conductor 55 through conductor 69, contact 68, conductor 70, the closed contacts of the cam switch 40 to the supply line 46. Upon rotation of the motor 38 the cam 35 will disengage the contacts of switch 42 permitting them to move to the closed circuit position thereby establishing a bypass circuit around contacts 68 of the relay 30. After a predetermined period of time the cam 36 will engage with the contacts of the normally closed switch 43 moving them to the open circuit position thereby deenergizing the relay 31. Upon dropout of relay 31 and opening of its contacts 65 the control circuit 19—20 for the switch gear 18 will be deenergized disconnecting the pump motor 14 from the power supply. The timer motor 38 will continue to rotate, reclosing the contacts of switch 43 and, after a predetermined period of time, the cam 33 will open the contact of switch 40 immediately breaking the timer motor circuit, stopping the motor and retaining the switch 40 in the open circuit position, thus completing the normal cycle of operation for the system.

In the operation of the system as described the pump motor 14 is merely started and stopped in response to corresponding predetermined variations in pressure head in the standpipe 13 with certain time delay periods occurring between the start and stop indications of the pressure responsive device and the actual connection and disconnection of the pump motor for reasons stated and others which will be presently described.

Assume now that a momentary power failure occurs during a time when the motor 14 is in operation. It will be recalled that during the operation of motor 14 the relay 30 is deenergized, the relay 31 is energized and the timing device 32 is at rest with the cam 35 holding the contacts of switch 42 in the opened position. Immediately upon power failure the relay 31 will drop out opening the control circuit 19, 20 for the switch gear 18 so that even though power should be restored shortly thereafter the switch gear 18 would not be immediately reclosed. Upon opening of the contacts 63 the holding circuit for the winding of relay 31 is broken so that the relay will not pick up upon restoration of power. On the other hand an additional contact 75 of relay 31 is moved to the closed circuit position so that a circuit is closed for the timer motor 38 extending from the conductor 55 through conductor 76, contact 75, conductors 77, 70 through the closed cam switch 40 to the supply line 46. Immediately upon restoration of power, the timer motor 38 will be energized through this circuit and which will be maintained in operation until the relay 31 is ultimately picked up and the switch gear 18 for the pump motor 14 reclosed. This cannot occur, however, until after a considerable lapse of time and within which the column of water within the well 11 has had ample time to descend sufficiently through the pump 10 to a stationary level and the motor, which was spun by the descending column of water in the reverse direction of rotation, brought to rest. In the case assumed the timer motor 38 is maintained in operation throughout one complete cycle starting from the position in which the cam 35 is holding the switch 42 open until it is again reopened. First the switch 42 is closed, then the switch 43 opened and then switch 40 opened. It will be observed, however, that the switch 40 is bypassed by the closed contact 53 of relay 30 maintaining an energizing circuit for the motor 38 through conductor 59. The motor will continue to operate closing the cam switch 41 momentarily to cause the pickup of relay 31 followed by the opening of the cam switch 42 thereby stopping the motor 38. Upon pickup of the relay 31 and closure of contact 65 the switch gear 18 will be closed to connect the pump motor 14 to the power supply. The operation of the pump motor 14 will continue until it is stopped by a rise of the mercury column 24 and pickup of relay 30.

It is obvious that if power failure occurs at any time when the mercury column 24 is below the contact of conductor 67, the pump motor will always be restarted following restoration of power irrespective of the exact position occupied by the cam switch device 32 at the instant of power failure. Thus the control arrangement will not be locked out due to occurrence of power failure during some intermediate position of the cam switch unit.

While not necessary to the operation of the arrangement of the present invention, a pair of signal lamps 80 and 81 may be provided for indicating the energized and deenergized conditions, respectively, of the switch gear control circuit 19—20. As shown, a red lamp 80 may be energized upon closure of the contacts 82 of relay 31 for indicating the deenergized condition while a red lamp 81 may be connected for energization upon completion of the circuit through contact 65 upon pickup of relay 31.

A test switch 85 is also provided for manually effecting energization of the timer motor 38. The switch 85 need be depressed only for a time sufficient to permit disengagement of the cam 33 from the switch 40 whereupon the system will proceed throughout the entire cycle. During such testing the relay 30 will generally be in a picked up condition so that the time switch will not stop upon opening of the switch contacts 42 by cam 35 but will continue in operation. During such testing the relay 31 will pick up upon closure of the switch 41 and will remain in such condition until switch 43 is opened a short time thereafter.

In a modification of the invention illustrated in Fig. 2 the holding circuit for relay 31 extending through the relay contact 63 is broken at terminals 90 and a motor protective device, such as a temperature responsive element 91, is connected therein. The temperature responsive element 91 may be arranged for indicating excessive bearing temperature so that upon occurrence of such a condition the holding circuit for the relay 31 will be disrupted to effect deenergization of the pump driving motor 14. The pump driving motor will thus be shut down for a predetermined period of time within which it is given an opportunity to cool off before it is restarted by the automatic operation of the control system throughout a complete cycle as described above.

The use of the step down transformer 44 for providing a low voltage for operating relay 33 is proposed in the embodiment herein described by reason of the particular form of pressure responsive device employed. In the arrangement as shown, it will be observed that the conductor 49 is grounded so that a direct connection between it and the source of supply would not be desirable. However, if a condition responsive device having all contacts electrically insulated from ground is substituted for the device 21, then the use of the transformer 44 may be dispensed with.

Having described the invention in what is considered to be a preferred embodiment thereof, it is desired that it be understood that the invention is not necessarily so limited and that the various details shown are merely illustrative. It is intended in the following claims to cover all such obvious variations and modifications as will occur to one skilled in the art without departing from the true spirit and scope of the invention.

I claim:

1. The combination comprising an electric driving motor, a deep well turbine pump driven by said motor and arranged for supplying water to a pressure reservoir, switch means responsive to maximum and minimum conditions of pressure head in said reservoir, a time switch connected to said switch means and adapted to be successively energized and deenergized in response to either maximum or minimum indications of said switch means, a control switch for said driving motor connected to said time siwtch whereby said driving motor will be energized a predetermined period of time following minimum indication of said switch means and deenergized a predetermined period of time following maximum indication of said switch means.

2. The combination comprising an electric driving motor, a deep well turbine pump driven by said motor and arranged for supplying water to a pressure reservoir, switch means responsive to minimum and maximum conditions of pressure head in said reservoir for providing corresponding indications, a time switch including a timer motor connected to said switch means and adapted to be energized in response to minimum and maximum indications of said pressure responsive switch means, means responsive to said time switch means for effecting delayed energization and deenergization of said pump motor in response to said minimum and maximum indications, and means for automatically effecting resetting of said time switch following failure of power during energization of said timer motor.

3. The combination comprising an electric driving motor, a pump driven by said motor and arranged for supplying fluid to a system under pressure, the connection of said pump to said system being characterized by the fact that upon de-energization of said motor the fluid from said system reverses through said pump for a short period of time following such de-energization, switch means responsive to minimum and maximum conditions of said system for providing corresponding start and stop indications for said motor, a time switch connected to said switch means and adapted to be successively energized and de-energized in response to either of said indications of said switch means, a switch gear for said driving motor controlled by said time switch whereby said driving motor will be energized a predetermined period of time following a start indication of said switch means, said switch gear being adapted to be tripped open upon failure of power, said time switch including means for automatically reclosing said switch gear a predetermined period of time following restoration of power whereby said pump is permitted to become unloaded following such power failure and before restarting of said motor.

4. The combination comprising an electric driving motor, a pump driven by said motor and arranged for supplying fluid under pressure to a system, the connection of said pump to said system being characterized by the fact that following any de-energization of said motor fluid flow reverses through said pump for a short period of time, switch means responsive to minimum and maximum conditions in said system for providing corresponding start and stop indications, a time switch connected to said switch means and adapted to be successively energized and de-energized in response to either of said indications, a switch gear for said driving motor adapted to be tripped out upon failure of power while said switch gear is closed, said time switch being adapted to be automatically energized upon restoration of power following such failure, means operated by said time switch whereby said switch gear is reclosed a predetermined period of time following restoration of power, said time switch including means for effecting de-energization of said driving motor a predetermined period of time following energization of said time switch in response to a stop indication of said switch means.

5. The combination comprising an electric driving motor, a pump driven by said motor and arranged for supplying fluid to a system under pressure, the connection of said pump to said system being characterized by the fact that upon de-energization of said motor the fluid from said system reverses through said pump for a short period of time following such de-energization, switch means for automatically effecting connection and disconnection of said motor to the power supply line in response to demand indications of said system, means responsive to power failure while said motor is connected for effecting disconnection of said motor from said power supply line, said switch means including means operable upon restoration of power for reconnecting said motor to said power supply line a predetermined period of time following said restoration of power whereby said reverse fluid flow through said pump is permitted to diminish prior to reconnection of said motor to said power supply line.

6. The combination comprising an electric driving motor, a pump driven by said motor and arranged for supplying fluid to a system under pressure, the connection of said pump to said system being characterized by the fact that upon de-energization of said motor the fluid from said system reverses through said pump for a short period of time following such de-energization, switch means for automatically providing start and stop indications for said motor in response to conditions in said system, a time switch including a timer motor connected to said switch means and energized upon said start and stop indications, said time switch including means for automatically effecting de-energization of said timer motor a predetermined period of time following initial energization thereof in response to either of said indications, a relay controlled by said time switch, a switch gear controlled by said relay for connecting and disconnecting said motor from the power supply line a predetermined period of time following said start and stop indications, respectively, of said switch means, said relay being adapted to drop out upon power failure, said relay including contacts closing upon drop out and connected for effecting energization of said timer motor upon restoration of power, said time switch including means for effecting pick-up of said relay and closing of said switch gear a predetermined period of time following said restoration of power.

7. The combination comprising an electric driving motor, a pump driven by said motor and arranged for supplying fluid to a system under pressure, switch means responsive to minimum and maximum conditions in said system for giving corresponding indications, a time switch connected to said switch means and adapted to be successively energized and de-energized in response to either of said indications of said switch means, a switch gear for said driving motor controlled by said time switch whereby said driving motor will be energized a predetermined period of time following minimum indication of said switch means, said time switch including means for rendering said time switch non-responsive to a maximum indication of said switch means for a predetermined period of time following closure of said switch gear.

8. The combination comprising an electric driving motor, a pump driven by said motor and arranged to supply fluid to a system under pressure, switch means responsive to minimum and maximum conditions of said system for providing start and stop indications for said motor, said system being characterized by the occurrence of surges following a starting of said pump, a time switch connected to said switch means and adapted to be energized and de-energized in response to either of said indications of said switch means, a switch gear for said driving motor controlled by said time switch whereby said driving motor will be energized a predetermined period of time following energization of said time switch in response to a start indication of said switch means, said time switch including means for precluding tripping of said switch gear due to a surge in said system immediately following starting of said motor and which might produce a false stop indication by said switch means.

ROBERT F. TEESON.

REFERENCES CITED

The following references are of record in the file of this patent:

UNITED STATES PATENTS

| Number | Name | Date |
|---|---|---|
| 1,130,476 | Carroll | Mar. 2, 1915 |
| 769,619 | MacKintosh | Sept. 6, 1904 |
| 1,913,557 | Millar | June 13, 1933 |
| 1,552,235 | Russell | Sept. 1, 1925 |
| 2,007,388 | Tarleton | July 9, 1935 |
| 2,220,769 | Lennox | Nov. 5, 1940 |
| 2,069,772 | Pearce | Feb. 9, 1937 |
| 2,262,869 | Veinott | Nov. 18, 1941 |